US011850492B2

(12) United States Patent
Thompson, Jr. et al.

(10) Patent No.: US 11,850,492 B2
(45) Date of Patent: Dec. 26, 2023

(54) SYSTEMS AND METHODS FOR PROVIDING RECREATIONAL ASSISTANCE

(71) Applicant: Extreme18, LLC, Franklin, TN (US)

(72) Inventors: John L. Thompson, Jr., Coto de Caza, CA (US); Steven M. Zika, Cave Creek, AZ (US)

(73) Assignee: Extreme18, LLC, Franklin, TN (US)

( * ) Notice: Subject to any disclaimer, the term of this patent is extended or adjusted under 35 U.S.C. 154(b) by 511 days.

(21) Appl. No.: 16/949,820

(22) Filed: Nov. 16, 2020

(65) Prior Publication Data

US 2021/0129004 A1    May 6, 2021

Related U.S. Application Data

(63) Continuation-in-part of application No. 15/866,856, filed on Jan. 10, 2018, now Pat. No. 10,894,199.

(60) Provisional application No. 62/444,681, filed on Jan. 10, 2017.

(51) Int. Cl.
*A63B 69/36* (2006.01)
*A63B 71/06* (2006.01)

(52) U.S. Cl.
CPC ...... *A63B 69/3635* (2013.01); *A63B 69/3605* (2020.08); *A63B 2071/0691* (2013.01); *A63B 2220/12* (2013.01)

(58) Field of Classification Search
CPC ............ A63B 69/3635; A63B 69/3605; A63B 2071/0691; A63B 2220/12; A63B 2071/068; A63B 2220/20; A63B 2225/50; A63B 71/0622; A63B 71/0669; A63B 69/36; G01S 19/19; H04W 4/023; H04W 4/025
See application file for complete search history.

(56) References Cited

U.S. PATENT DOCUMENTS

| | | | | |
|---|---|---|---|---|
| 9,079,060 B2* | 7/2015 | Hong | ............ | A61B 5/7455 |
| 9,322,920 B2* | 4/2016 | Lee | ............ | A63B 57/00 |
| 9,383,448 B2* | 7/2016 | Park | ............ | A63B 71/0619 |
| 9,917,561 B1* | 3/2018 | Clary | ............ | H03G 3/3005 |
| 10,936,076 B2* | 3/2021 | Wu | ............ | A63B 71/0622 |
| 2008/0143954 A1* | 6/2008 | Abreu | ............ | G06F 3/167 |
| | | | | 351/158 |
| 2009/0079625 A1* | 3/2009 | Denton | ............ | A63B 57/00 |
| | | | | 342/357.57 |
| 2010/0317371 A1* | 12/2010 | Westerinen | ............ | H04M 1/72451 |
| | | | | 455/456.6 |
| 2011/0077093 A1* | 3/2011 | Garratt | ............ | A63B 69/3658 |
| | | | | 473/131 |
| 2012/0069131 A1* | 3/2012 | Abelow | ............ | G06Q 30/0601 |
| | | | | 345/589 |
| 2015/0181314 A1* | 6/2015 | Swanson | ............ | G01S 19/19 |
| | | | | 340/870.07 |

* cited by examiner

*Primary Examiner* — Jeffrey S Vanderveen
(74) *Attorney, Agent, or Firm* — JoAnn M. Seaton; Griffiths & Seaton PLLC (57) ABSTRACT

A system for providing recreational assistance includes a frame and a speaker and at least one processor connected to the frame. The at least one processor is in operable communication the speaker and a user input device and configured to, in response to the detection of user input by the user input device, generate a signal representative of a distance between the frame and a landmark and cause the speaker to generate an aural indication representative of the distance.

19 Claims, 4 Drawing Sheets

SYSTEMS AND METHODS FOR PROVIDING RECREATIONAL ASSISTANCE

CROSS-REFERENCE TO RELATED APPLICATIONS

This application is a continuation-in-part of U.S. patent application Ser. No. 15/866,856, filed on Jan. 10, 2018, which claims priority to U.S. Provisional Application No. 62/444,681, filed on Jan. 10, 2017, both of which are herein incorporated by reference for all purposes.

BACKGROUND OF THE INVENTION

Field of the Invention

The present invention relates in general to computing systems, and more particularly, to various embodiments for providing recreational assistance during various activities, such as playing golf.

Description of the Related Art

Every year, millions of people around the world take part in various activities, such as recreational activities, that may be enhanced by the participants utilizing various types of electronic devices. For example, while playing a round of golf, participants may use various devices to determine/measure distances (e.g., from their current location to a green), play audio files (e.g., music or golfing tips), keep score and/or play various types of games against other golfers, order refreshments, call for assistance (e.g., if their cart breaks down), etc.

However, generally speaking, in order to perform all of the desired functions, users must utilize more than one, and sometimes several, devices. For example, a user may find themselves alternating between a stand alone Global Positioning System (GPS) module, a tablet device, and a mobile phone in order to enhance the activity as desired.

SUMMARY OF THE INVENTION

Various embodiments for providing recreational assistance are described. In one embodiment, by way of example only, a recreational (e.g., golfing) assistant device is provided. The device includes a frame and a speaker and at least one processor connected to the frame. The at least one processor is in operable communication with the speaker and a user input device and configured to, in response to the detection of a user input by the user input device, generate a signal representative of a distance between the frame and a landmark and cause the speaker to generate an aural indication representative of the distance.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As discussed above, countless people around the world take part in various activities, such as recreational activities, that may be enhanced by the participants utilizing various types of electronic devices. For example, while playing a round of golf, participants may use various devices to determine/measure the distances (e.g., from their current location to a green), play audio files (e.g., music or golfing tips), keep score and/or play various types of games against other golfers, order refreshments, call for assistance (e.g., if their cart breaks down), etc.

Generally speaking, in order to perform all of the desired functions, users must utilize more than one, and sometimes several, devices. For example, a golfer may find themselves alternating between a stand alone Global Positioning System (GPS) module, a tablet device, a wireless speaker, and a mobile phone in order to enhance their round of golf as desired. Doing so may be cumbersome and frustrating, as at least some of the devices must be manually controlled separately, which may result in the overall experience not be optimized, and may even lead to one or more of the devices being lost and/or damaged (e.g., if a mobile phone is dropped while the user is trying to order food/drinks from the clubhouse).

To address these needs, embodiments described herein provide systems and methods for providing recreational assistance utilizing devices with multiple types of functionality integrated into a single, portable frame (or casing or housing). Although much of the description provided herein refers to the use of these methods and systems in relation to golf, it should be understood that the embodiments described herein may be applied to other types of recreational activities, such as disc golf, hunting, fishing, camping, etc. Furthermore, the embodiments described herein may be applied to work-related activities, such as surveying and construction.

According to some of the embodiments described herein, an assistant device is provided that includes a portable frame (or housing) with various types of functionality integrated therein, such as those described below and/or any combination thereof. In some embodiments, the assistant device includes a Global Positioning System (GPS) module to, for example, determine the location of the frame and/or the distance between two points (e.g., the distance between the frame and a landmark, such a portion of a green on a golf course). The assistant device may include at least one user input device (e.g., one or more buttons/keys, a touchpad, one or more microphones, etc., which may be connected to the frame/device or separate from/external to the frame/device) and at least one speaker, which may be utilized in combination with the GPS module (and/or the other components/ features included), as described below. The assistant device may include a wireless communication receiver and/or transmitter (e.g., a transceiver), such as a BLUETOOTH enabled transceiver, to, for example, interact with other devices and/or software components installed on other devices (e.g., mobile electronic devices, such as mobile phones) in a vicinity of the frame. Other features may include, for example, an internal memory, an audio codec, a power supply (e.g., a battery), a display device (e.g., a liquid-crystal display (LCD)), a voice processing module (or chipset), and various ports/inputs (e.g., for audio bypass). At least some of the functionality may be provided by at least one processor, as is commonly understood in the art.

In some embodiments, the assistant device provides an "aural" (or audio) navigation experience. That is, the GPS functionality may be enhanced by the device responding to aural (or voice) commands (or requests or inquiries) and/or providing aural notifications that include navigational (or GPS) information, such as a distance between two points. For example, while playing a round of golf, a user may speak a command (or actuate a button) that is indicative of a request for the distance to the green of the current hole (or flagstick), or more specifically, the distance between the assistant device and a portion of the green of the current hole (e.g., "distance to hole"). Upon detecting (or receiving) the user input (e.g., the actuation of the button or detecting of the aural command), the pertinent information may be retrieved from and/or determined using the GPS module. The information may then be communicated to the user by, for example, text shown on a display or an aural notification (e.g., via the speaker(s) on the device) that is indicative of the distance. The aural notification may include a voice response or speech (e.g., "165 yards").

In some embodiments, different types of user input, such as aural commands (or different aural commands) may result in different information being communicated by the device (or aural notification). For example, if the user input includes an aural command that is indicative of a request for the distance to a particular portion of the green (e.g., "distance to front" or "distance to back"), an aural notification may be appropriately tailored by including the specific information requested (e.g., the distance between the device and the front edge of the green or the back edge of the green, as opposed to the distance to the hole/flagstick on the green).

In some embodiments, the aural commands (or other user input) may also be used to perform other functions, such as "navigating" the environment, such as a golf course. For example, the user may voice an aural command that is indicative of the completion of a particular hole (e.g., "next hole"), which may notify the device that the GPS mapping data utilized should include the green for the next hole on the course. As another example, the user may speak an aural command that indicates the user is about to play a particular hole (e.g., "set hole number 7"), such as may be the case in which the player has decided to play particular holes for practice.

In this manner, embodiments described herein may provide "hands free" GPS functionality and/or distance estimations (i.e., without the user needing to manually manipulate the device), allowing the user to perform other actions while obtaining the GPS information (e.g., taking a club from his/her golf bag, eating/drinking, etc.).

In some embodiments, the assistant device provides other functionality, perhaps utilizing the wireless communication transceiver in combination with another computer device (e.g., a mobile phone, a tablet device, a golf cart equipped with various computing devices and other components, etc.) in the vicinity of the assistant device (or frame). For example, audio files may be transmitted from the other computing device to the assistant device and rendered by the speaker(s) (e.g., music may be "streamed" from a user's mobile phone or tablet device, transmitted to the wireless communication transceiver, and played by the speaker(s)). As another example, various types of software components (or applications) may be utilized through the assistant device, such as a software component associated with golf (e.g., a "scoring" application or "skins" application), which may be installed on another computing device and operated through the assistant device via the wireless communication transceiver, or alternatively, installed on the device itself (and implemented by a processor and/or a memory on the device). The assistant device may also be used for various types of communication, such as making phones calls (e.g., a "speaker phone" functionality), sending texts/emails, placing orders, etc. (e.g., when utilized with another computing device).

The various functionality provided by embodiments described herein may be operated using aural/voice commands (or user input provided using other user input devices), as described above with respect to the GPS functionality. However, as alluded to above, it should be understood that in some embodiments, other user input devices (e.g., buttons, keys, touchpads, etc.) may (also) be included on the device and used to control the various types of functionality described herein.

In particular, in some embodiments, a recreational (e.g., golfing) assistant device is provided. The golfing assistant device includes a frame and a Global Positioning System (GPS) module, at least one speaker, and at least one processor connected to the frame. The at least one processor is in operable communication with the GPS module, the at least one speaker, and a user input device. The at least one processor is configured to, in response to the detection of user input by the user input device, cause the at least one speaker to render an aural indication generated based on GPS information received from the GPS module. The at least one processor is further configured to cause the at least one speaker to render at least one audio file and cause a volume with which the at least one audio file is rendered by the at least one speaker to be adjusted while the aural indication is rendered by the at least one speaker.

The at least one processor may be further configured to cause the volume with which at least one of the aural indication and the at least one audio file is rendered by the at least one speaker to be adjusted based on at least one of the GPS information and a computing device being detected within a predetermined distance of the frame. The at least one processor may be further configured to cause the volume with which the at least one audio file is rendered by the at least one speaker to be reduced based on a second golfing assistant device being detected rendering a second audio file within a predetermined distance of the frame.

The causing of the volume with which the at least one audio file is rendered by the at least one speaker to be reduced may include causing the rendering of the at least one audio file by the at least one speaker to be ceased. The at least one processor may be further configured to cause the at least one speaker to render the second audio file after said cessation of the rendering of the at least one audio file by the at least one speaker. The at least one processor may be further configured such that the rendering of the second audio file by the at least one speaker is synchronized with rendering of the second audio file by the second golfing assistant device.

The user input device may include at least one of at least one button and at least one microphone. The user input device may be at least one of connected to the frame and separate from the frame. If the user input device includes at least one microphone, and the user input detected by the user input device may include an aural command.

The GPS information may include a distance between the frame and a landmark on a golf course. The at least one processor may be further configured to cause the volume with which at least one of the aural indication and the at least one audio file is rendered by the at least one speaker to be adjusted when the frame is within a predetermined distance of the landmark based on the GPS information indicating that the landmark is at least one of a portion of a green on the golf course and a tee box on the golf course.

The golfing assistant device may further include a wireless communications receiver connected to the frame and in operable communication with the at least one processor. The wireless communications receiver may be configured to receive data from a computing device in a vicinity of the frame, wherein the data comprises the at least one audio file.

In some embodiments, a golfing assistant device is provided. The golfing assistant device includes a frame and at least one speaker and at least one processor connected to the frame. The at least one processor is in operable communication with the at least one speaker and a user input device. The at least one processor is configured to, in response to the detection of user input by the user input device, generate a signal representative of a distance between the frame and a landmark on a golf course and cause the at least one speaker to render an aural indication representative of the distance. The at least one processor is further configured to cause the at least one speaker to render at least one audio file and cause a volume with which one of the aural indication and the at least one audio file is rendered by the at least one speaker to be adjusted while the other of the aural indication and the at least one audio file is being rendered.

The at least one processor may be further configured to receive navigation information from a navigation system module external to the frame. The signal representative of the distance between the frame and the landmark on a golf course may be generated based on the navigation information. The at least one processor may be further configured to cause the volume with which at least one of the aural indication and the at least one audio file is rendered by the at least one speaker to be adjusted based on at least one of the navigation information and a computing device being detected within a predetermined distance of the frame. The golfing assistant device may further include a wireless communications receiver connected to the frame and in operable communication with the at least one processor.

The user input device may include at least one of at least one button and at least one microphone. The user input device is at least one of connected to the frame and separate from the frame. If the user input device includes at least one microphone, the user input detected by the user input device may include an aural command.

The at least one processor may be further configured to cause the volume with which the at least one audio file is rendered by the at least one speaker to be reduced based on a second golfing assistant device being detected rendering a second audio file within a predetermined distance of the frame. The causing of the volume with which the at least one audio file is rendered by the at least one speaker to be reduced may include causing the rendering of the at least one audio file by the at least one speaker to be ceased. The at least one processor may be further configured to cause the at least one speaker to render the second audio file after the cessation of the rendering of the at least one audio file by the at least one speaker. The at least one processor may be further configured such that the rendering of the second audio file by the at least one speaker is synchronized with rendering of the second audio file by the second golfing assistant device.

Figure 1:
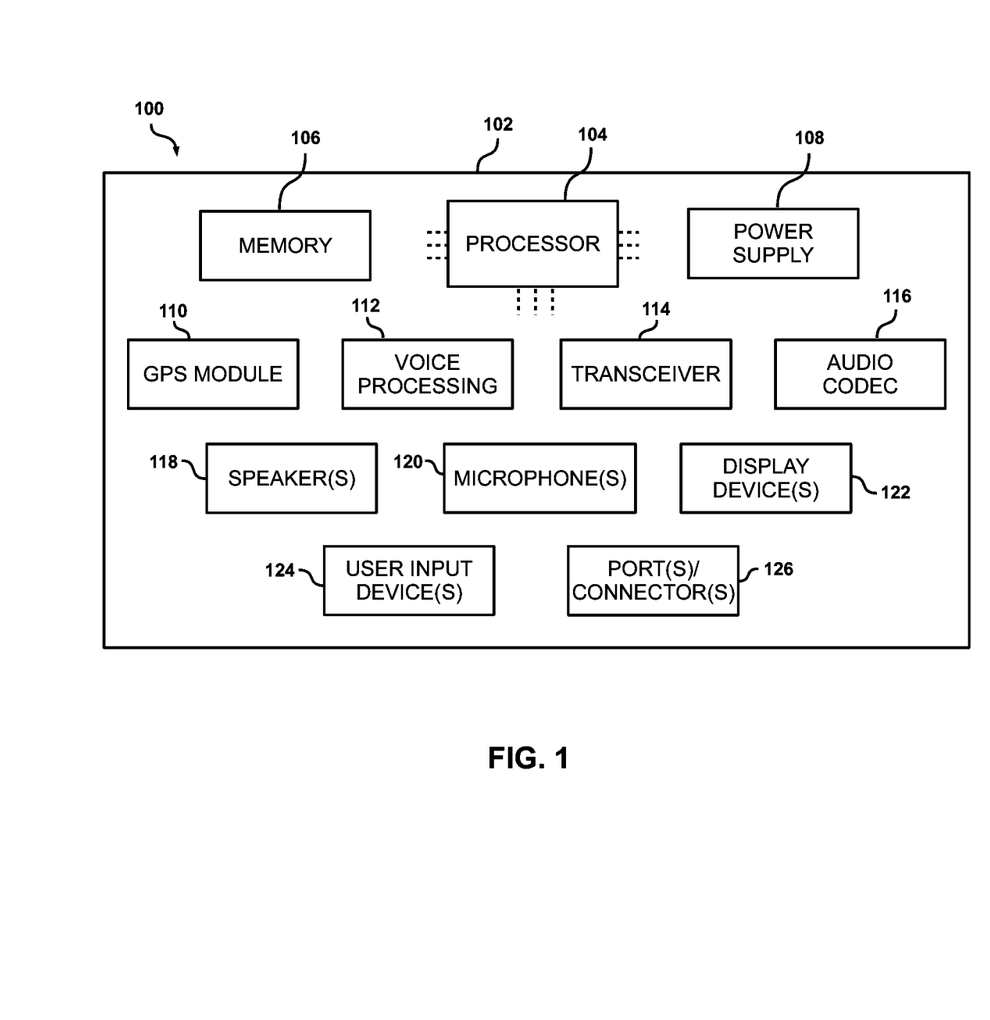
FIG. 1 is a block diagram depicting a recreational assistant device according to an embodiment of the present invention.

Referring now to FIG. 1, a simplified block diagram of a recreational assistant device 100 according to some embodiments described herein is illustrated. As described above, in some embodiments, the assistant device 100 may be provided with functionality that may make the assistant device 100 particularly beneficial for users playing golf. However, also as described above, in some embodiments, the assistant device 100 (or similar devices described herein) may be utilized in other activities, both recreational and work-related.

As shown in FIG. 1, the assistant device 100 includes a frame (or casing or housing) 102. The frame may be made of (or at least include) any suitable material, such as metals (e.g., aluminum, steel, etc.), plastics/polymers, and/or combinations thereof. In the depicted embodiment, connected (or coupled) to the frame 102 and/or housed within the frame 102 are a processor 104, a memory 106, a power supply 108, a GPS module 110, a voice processing module (or hardware) 112, a transceiver 114, an audio codec 116, a speaker(s) 118, a microphone(s) 120, a display device(s) 122, a user input device(s) 124, and a port(s) and/or connector(s) 126. The various components 104-126 of the device 100 may generally jointly perform the functionality of the device(s) and/or the methods described herein.

The processor 104 may be, for example, any suitable microcontroller (MCU) and/or microprocessor (MPU), as is commonly understood in the art, which is capable of and/or configured to control the overall functioning of the device 100 as described herein. As such, the processor 104 (as well as any of the other components 106-126) may include, for example, any suitable substrate (e.g., silicon, printed circuit board (PCB), etc.) with an integrated circuit formed thereon/coupled thereto, including multiple transistors, capacitors, etc. Although not explicitly shown, it should be understood that the processor 104 may be in operable communication (e.g., via a bus, conductive lines, vias, etc.) with the other components 106-126 shown in FIG. 1 (and/or the components 104-126 may be in operable communication with each other) in any suitable manner to provide the functionality of the assistant device 100 as described herein.

The memory 106 may be any suitable memory utilized for storing various types of data which may be utilized by the device 100 to perform the various forms of functionality described herein (e.g., GPS data, audio files, processor instructions, etc.). For example, the memory 106 may include a NAND flash memory and/or a NOR flash memory.

The power supply 108 may include any suitable source of electrical power that may be utilized to operate the assistant device 100 as described herein. For example, the power supply 108 may include a (rechargeable) lithium-ion battery (e.g., 2200 milliampere hour (mAh)).

The GPS module 110 may include any suitable antenna and/or receiver capable of receiving information from one (or more) of various satellite navigation systems, as is commonly understood, which may be used in any suitable manner to achieve the functionality described herein. Although the term "GPS" may be frequently used in this description, it should be understood that any suitable navigation system may be used that allows, for example, the determining of various types of navigational information, such as the distance between the frame 102 and another item, such as a landmark (e.g., a portion of a green on a golf course). For example, any suitable satellite navigation system (or Global Navigation Satellite System (GNSS)) receiver may be used, including, for example, those utilizing GPS and/or the GLONASS, Galileo, and BeiDou satellite systems. Appropriate mapping data may be loaded onto, for example, the GPS module 110 and/or the memory 106 (e.g., via the ports/connectors 126 and/or the transceiver 114) and used as described herein (e.g., to determine the distance between the device 100 and various landmarks, such as portions of greens on a golf course). As described herein, the data may be "tagged" in such a way to indicate the type/nature of the particular landmark (e.g., tee boxes, greens, clubhouses, restrooms, etc.).

The voice processing module 112 may include any hardware suitably configured to analyze, learn, and/or recognize speech (or voice commands, requests, etc.) and convert the speech into text and/or vice versa, as is commonly understood. As one example, the voice processing module 112 may include a Text-to-Speech (TTS) and/or Speech-to-Text (STT) chipset.

The transceiver 114 may include any suitable wireless communication transceiver (and/or antenna). In some embodiments, the transceiver 114 includes a BLUETOOTH (and/or BLUETOOTH Low Energy (BLE)) enabled transceiver. However, it should be understood that other types of wireless protocols/technologies may be utilized, such as Wi-Fi, Long-Term Evolution (LTE), Z-WAVE, Zigbee, Wireless USB, etc., and even optical infra-red.

The audio codec 116 may include a device and/or software component that is configured to encode and/or decode a digital stream or signal, such as audio data, as is commonly understood. In embodiments in which the audio codec 116 is a (standalone) device, the audio codec 116 may include an analog-to-digital converter (ADC) and a digital-to-analog converter (DAC), operating using the same clock signal.

The speaker(s) 118 may include any electroacoustic transducer(s), as is commonly understood, suitable of generating the desired sounds (e.g., voice/speech messages, playing music, and other sounds). The microphone(s) 120 may include any transducer suitable for converting sounds into electrical signals, via, for example, air pressure variations, as is commonly understood. In some embodiments, multiple microphones 120 may be included/utilized, which may, for example, facilitate voice recognition (e.g., far-field voice/speech recognition), beamforming, echo cancellation, barge-in, and digital signal processing, as will be appreciated by one skilled in the art.

The display device(s) 122 may include any components suitable for visually providing information to a user. In some embodiments, the display device(s) 122 includes a display screen, such as an LCD, and/or other devices, such as indicator lights (e.g., light-emitting diode (LED) indicator lights).

The user input device(s) 124 may include any component suitable configured to be manually manipulated by a user to control aspects of functionality of the device 100. Examples include buttons, keys, dials, "sliders," touchpads, etc., or more generally any other type of suitable user input device in addition to microphones. In some embodiments, one or more of the user input device(s) 124 may be located on a "key fob" (or similar device, such a remote control or mobile phone) which may be separate from the frame 102 and be configured to communicate with the other components of the assistant device 100 in any suitable manner (e.g., via transceiver 114). The port(s)/connector(s) 126 may include any type of port and/or connector suitable for performing various functions, such as charging the power supply 108, uploading data into the memory 106 and/or the GPS module 110, etc., such as a power connector port, a Universal Serial Bus (USB) port, etc.

It should be understood that in some embodiments, different components (i.e., more or less) may be included in the assistant device 100. Additionally, some of the functionality provided by more than one of the components 104-126 shown in FIG. 1 may be performed by a single component. For example, the functionality performed by the GPS module 110, the transceiver 114, and/or the audio codec 116 may be performed by the processor (e.g., a MCU). Additionally, it should be understood that in some embodiments, at least some of the components/functionality shown in FIG. 1 and described above may be distributed among more than one device. For example, at least some of the functionality (e.g., GPS, speakers, etc.) may be integrated into other devices, such as mobile phones, tablets, golf carts, etc., and utilized by the assistant device 100 via any suitable communications link (e.g., wireless, electrical connectors/wires, etc.).

Figure 2:
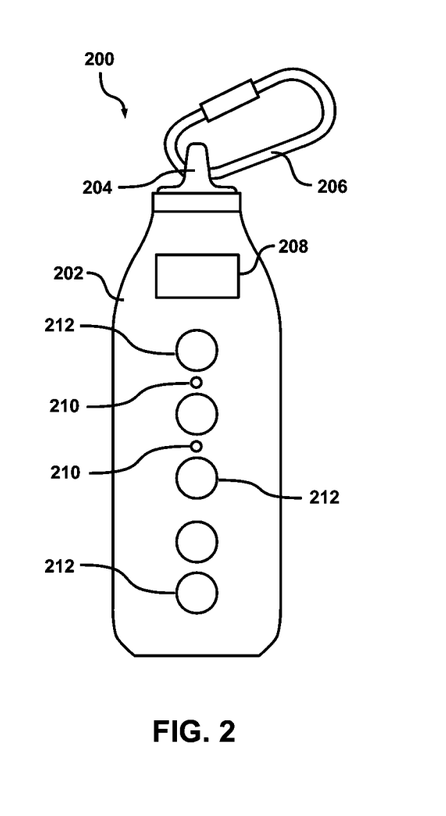
FIG. 2 is a side view of a golfing assistant device according to an embodiment of the present invention.

Referring now to FIG. 2, a side view of a golfing assistant device 200, according to some embodiments described herein, is shown. The assistant device 200 includes a frame 202 (e.g., similar to frame 102 described above). In the depicted embodiment, the frame 202 has a substantially elongated shape that may be similar to that of a drink receptacle, and although not shown in detail, may have a substantially circular cross-section. The frame 202 may have, for example, a height of between about 10 centimeters (cm) and about 40 cm (e.g., about 23 cm), and a width (or diameter) of between about 3 cm and about 10 cm (e.g., about 6 cm). In some embodiments, at least a portion of the exterior of the frame 202 is covered with a textured material, such as a rubberized coating. Although not specifically shown in FIG. 2, the assistant device 200 may include, as described above, one or more speakers and one or more microphones, which may (or may not) be visible on the exterior of the frame 202.

At an upper portion 204 thereof, the frame 202 may have a hole formed, through which an attachment mechanism 206 may be inserted. In the depicted embodiment, the attachment mechanism 206 is a karabiner that may be used to secure the assistant device 200 to, for example, a golf bag, a golf cart, etc. However, it should be understood that other types of mechanisms, such as wire loops, straps, etc., may be used to secure the assistant device 200 in any suitable manner.

In the depicted embodiment, the assistant device 200 includes several display devices on a side of the frame 202, including a display screen 208 and indicator lights 210. The display screen 208 may include an LCD, and the indicator lights 210 may include LED indicators. The display screen 208 may have, for example, a width of between about 2 cm and about 6 cm (e.g., about 4 cm) and a height of between about 1 cm and about 4 cm (e.g., about 2 cm).

Still referring to FIG. 2, the assistant device 200 also includes multiple user input devices 212 in the form of buttons (e.g., five buttons) in the example shown. The user input devices 212 may be used for any suitable purpose, examples of which are described below.

A "power" button may be included that may be used to toggle the assistant device 200 between ON and OFF states. For example, a small/quick actuation/press of the power button may turn the assistant device 200 ON, while a longer actuation (e.g., several seconds) may be used to turn the device OFF. A "golf mode" button may be used to activate the GPS module/functionality and "golf mode functionality." For example, if the assistant device 200 is ON, a relatively long press of the golf mode button may activate (or deactivate) the golf mode functionality. If the golf mode functionality is activated, a quick actuation may cause an aural indication to be generated by the speakers that informs the user(s) of the distance between the assistant device 200 and a portion (e.g., the center or flagstick) of the green of the current golf hole. A "golf hole" button may be used to navigate from one hole to the next (i.e., to indicate the GPS information utilized should be based on the position of the green of the next golf hole). A "phone button" may be used to operate a phone functionality (i.e., in combination with a mobile phone in the vicinity of the assistant device 200), such as to answer the phone and/or "hang up" the phone. A "play/pause" button may be used to cause music to be played by the speakers and/or pause the playing of music. An "up/forward" button may be used to increase the volume with which the music (and/or the aural indications) are rendered (e.g., when depressed for a relatively long time, the device is "connected" to another computing device/software component for playing music, and music is currently playing), as well as skip to the next song/track (e.g., when depressed for a short time and music is currently playing). Similarly, a "down/back" button may be used to decrease the volume, as well as return to the beginning of the current song and/or go back to the previous song.

Figure 3:
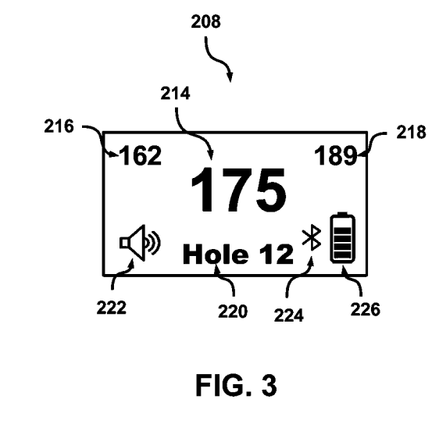
FIG. 3 is a plan view of a display device of the golfing assistant device of FIG. 2 according to an embodiment of the present invention.

FIG. 3 illustrates exemplary operation of the display screen 208, according to some embodiments described herein. As shown, various types of information and/or indicators may be displayed. In the depicted embodiment, the displayed information includes a "primary" distance 214, "secondary" distances 216 and 218, "location" 220, volume 222, wireless connectivity 224, and remaining power 226. In some embodiments, the primary distance 214 is indicative of the distance (e.g., in yards or meters) between the device (and/or the frame) and the center (or hole/flagstick) of the "current" green of a round of golf being played by the user. Secondary distances 216 and 218 are indicative of the distances to the front edge and back edge of the green, respectively. The location indicator 220 is indicative of the hole number of the current golf hole (i.e., the location indicator 220 may indicate which green on the golf course is being used to determine the distances indicated as the primary and secondary distances).

The volume indicator 222 may provide a representation of the current volume setting (e.g., for aural indications, music being played by the device, etc.). In the depicted embodiment, the volume indicator 222 is shown as an image/icon of a speaker. As will be appreciated by one skilled in the art, the number of "waves" shown emanating from the speaker image/icon may change as the volume is adjusted (e.g., via aural commands and/or user input devices).

The wireless connectivity indicator 224 may be indicative of whether or not the device 200 is "connected" to an external computing device (e.g., a mobile phone, tablet device, etc.) via the transceiver 114. That is, when the device 200 is connected to another computing device via wireless communication, the wireless connectivity indicator 224 may be shown/visible on the display screen 208, otherwise, the wireless connectivity indicator 224 may not be shown/visible on the display screen 208.

The remaining power indicator 226 may be used to indicate the remaining power/charge of the power supply 108 (FIG. 1). In the depicted embodiment, the remaining power indicator 226 is shown in the form of an image/icon of a battery, with the number of "bars" and/or the amount the battery is "filled" indicating the charge state of the power supply, as is commonly understood in the art.

It should be understood that in some embodiments, the various types of information indicated by the display screen 208 may be communicated to a user via aural indications in a manner similar to that described above. For example, if an aural command is detected that is indicative of a request for the current battery charge, an appropriate aural indication (e.g., speech, such as "80%") may be caused to be generated by the speaker(s) 118 (FIG. 1).

As described above, the devices described herein may be used to perform various types of functionality related to, for example, the user(s) playing golf. The functionality may include, for example, navigational information, playing music (or other audio files), interacting with software components on another computing device, and communicating with other parties (e.g., ordering food/drink, making phone calls, sending text messages or emails).

As also described above, the various types of functionality may be controlled via voice (or aural) commands, examples of which are described below. In some embodiments, voice commands begin with a particular "indicator word" that allows the device (and/or the voice processing module) to recognize that the speech is a command/request intended to control the assistant device. For example, voice commands may begin with generic indicator words, such as "device" or "golf helper" or more specific words, such as a name (e.g., "Beacon").

In some embodiments, at least when the assistant device is not connected to (or communicating with) another computing device (and/or connected to the Internet through another computing device), the detection of the voice commands "volume up" (or "Beacon volume up") and "volume down" may result in the volume of the aural indications and/or music being suitably adjusted. "Distance" may result in the creation of an aural indication that includes the distance between the assistant device and the center of the green (and/or the flagstick) of the golf hole currently being played by the user, while "distance to front" and "distance to back" may result in the distance to the front edge of the green and the back edge of the green, respectively. "Next hole" which may notify the device that the GPS mapping data utilized should include the green for the next hole on the course, while "back one hole" may result in the mapping data being used including the green of the previous hole on the course. "Start round" may initiate a round of golf (e.g., setting the current hole to the first hole), while "end round" may cause the GPS functionality to cease. "Set hole number X" (e.g., "set hole number 7") may be used to indicate that the user is about to play a particular hole (e.g., such as may be the case in which the player has decided to play just particular holes for practice).

In some embodiments, at least when the device is connected to another computing device (and/or connected to the Internet through another computing device), such as when music from another device is being played (e.g., from a memory on the other device and/or being streamed from the Internet), the detection of the voice command "pause music" may result in the music being paused (e.g., for a predetermined amount of time or until a "play music" command is detected). "Next song" may result in the next song/track being played.

It should be noted that the voice commands may also be used to control the communication functionality provided by the assistant device (and/or by another computing device through the devices described herein). For example, if a phone is received (which may be indicated by an aural indication, such as a ring tone, being generated by the speakers), a voice command such as "send to voicemail" may result in the call not being answered, but the caller may simply be sent to a voicemail service/box. Further, it should be noted that when the assistant device is connected to the Internet (e.g., via the transceiver and another computing device), voice commands may be sent to and/or processed by online intelligent personal assistants, which may result in various types of actions being taken (e.g., either by the assistant device and/or other services).

Additionally, in some embodiments, the assistant device (e.g., the voice processing module 112 and/or via an online assistant) is configured with a "voice recognition" functionality. That is, the assistant device may be configured to learn/recognize voices so that when a particular user provides a voice command to, for example, indicate his/her score on a hole, that score more be appropriately recorded (e.g., via a score keeping application on a mobile electronic device) for that user, and when a different user provides a similar command, that user's score is appropriately recorded. The voice recognition may also be used to perform other functions, such as making phone calls (e.g., via the transceiver, as described above), so that the action taken is specific to the particular user.

In some embodiments, the assistant device is configured to automatically adjust some aspects of operation/functionality if certain circumstances are detected. For example, if the assistant device (and/or the frame) is detected as being within a predetermined distance (e.g., 20 yards) of particular landmarks (e.g., greens and/or tee boxes on a golf course), the volume (e.g., of music being played and/or of aural indications) may be automatically reduced (e.g., reduced by 50%) or lowered to a particular volume setting (if the volume is previously set higher than that setting). In such embodiments, the volume may then be (automatically) increased when the assistant device is detected as moving to a position beyond the predetermined distance of the landmark(s). Such functionality may be activated/deactivated and/or adjusted via device settings and/or preferences (as may the other functionality described herein).

However, it should be noted that in some embodiments at least some functionality described herein (e.g., the automated volume control/limiting described above, providing distances, etc.) may be enabled by the navigation (e.g., GPS) information utilized by the assistant device. That is, the information may be provided (e.g., "tagged") in such a way to indicate not only that particular landmarks are relevant to the user's activity but also indicate any functions that may (or "should") be performed at particular locations because of the nature of those locations. For example, in an embodiment/scenario in which the assistant device automatically reduces (or limits) the volume of any generated sounds when the device (or frame) is determined to be within a predetermined distance of a green or tee box on a golf course, such functionality may be enabled (or caused) by GPS information indicating that the relevant landmark(s) is a green or tee box. As such, in at least some embodiments, the automated volume control (along with any other functionality described herein) may be performed by the assistant device the first time (and any subsequent times) the assistant device (and/or the user) is at a particular location (e.g., at a particular golf course). More particularly, in at least some embodiments, the assistant device does not have to receive any user input to perform such functionality. In other words, in some embodiments, automated volume control is performed in response to the location of the assistant device and the particular navigation information received, as opposed to, for example, the assistant device "learning" such behavior/functionality over time based on user input/activity (e.g., the user manually adjusting the volume when near tee boxes on multiple occasions).

Additionally, in some embodiments, administrators (e.g., golf course management) may be provided with the ability to selectively mandate or limit various functionality (e.g., the automated volume control) under particular circumstances. In some embodiments, such may be performed by, for example, the administrators "tagging" navigation information, providing a control signal via wireless communications (e.g., Wi-Fi), or in any other suitable manner. For example, on particular days, at particular times, etc. (e.g., during tournaments, when the course is particularly busy, etc.), the administrators may limit or completely prevent users playing music with their assistant devices or further limit the volume of sounds (e.g., aural indications and/or music) or further limit areas of the course in which music may be played.

Also, if two (or more) assistant devices are detected as being within a predetermined distance of each other, the operation of at least one of the assistant devices may be automatically adjusted. For example, if both assistant devices are being used to play music, when the devices are detected as being relatively close to each other (e.g., within 10 yards), the volume with which music is being played by at least one (e.g., one or both) of the devices may be automatically reduced (and/or the music being played by that device may be paused). Also, in some embodiments, the assistant devices may be "synched" (e.g., via the transceiver 114) so that both devices play the same music (e.g., "in-time" or fully synchronized with each other such that the devices are rendering the audio file "together") and/or generate the same aural indications and/or jointly perform any other aspect of functionality described herein.

In some embodiments, such synching (and/or the automated volume control) may occur between the assistance device(s) and other types of computer devices (e.g., tablets, computer devices integrated into vehicles, etc.) or entertainment systems based on, for example, user and/or administrator preferences. For example, if a golf course is playing music and/or providing aural indications utilizing speakers near/around the clubhouse, when an assistant device is detected within a predetermined distance of the clubhouse, any sounds generated by the device may be synched with those generated by the administrators near the clubhouse (e.g., to prevent an unpleasant or cacophonic environment) or prevented altogether.

In some embodiments, particular aspects of the music synching may be set utilizing a settings/preferences functionality. For example, the user(s) may set whether or not music being played on a particular device will be paused (and/or reduced in volume) when another device is detected nearby, followed by that particular device playing the same music being played on the other device, or vice versa. More particularly, consider a scenario in which a first assistant device is playing a first audio file (or song) while a second assistant device is playing a second audio file. Based on, for example, the preference settings of the devices, if the two devices are detected as being within a predetermined distance of each other, the first device may cease (e.g., "pause") rendering the first audio file and begin rendering the second audio file (e.g., "in-time" or fully synchronized with the rendering of the second audio file by the second device). However, the opposite may occur if, for example, the preferences are changed. As another example, which again may be set via preferences or perhaps as a default setting, movement of the devices may be taken into account. For example, if the second device is determined to be moving while the first device is stationary (i.e., it is the movement of the second device that causes the two devices to come within the predetermined distance of each other), such may cause the first device to be given priority such that the first device continues playing the first audio file, and the second device ceases playing the second audio file and begins to play the first audio file (or perhaps ceasing playing music altogether).

Further, in some embodiments, when the assistant device is being used to play music (or render another audio file), the volume of the music and/or any aural indications that are generated may be adjusted. For example, if the assistant device detects an aural command (or other user input) while music is being played, the volume of the music may be reduced (and/or the music may be paused) while an aural indication is generated in response to the aural command (or vice versa). As one specific example, in embodiments in which the assistant device has more than one speaker, such as a "left" speaker and a "right" speaker, the volume of the music being rendered by one of the speakers may be reduced (or completely prevented from being rendered by that speaker) while that speaker is used to generated the aural indication.

Figure 4:
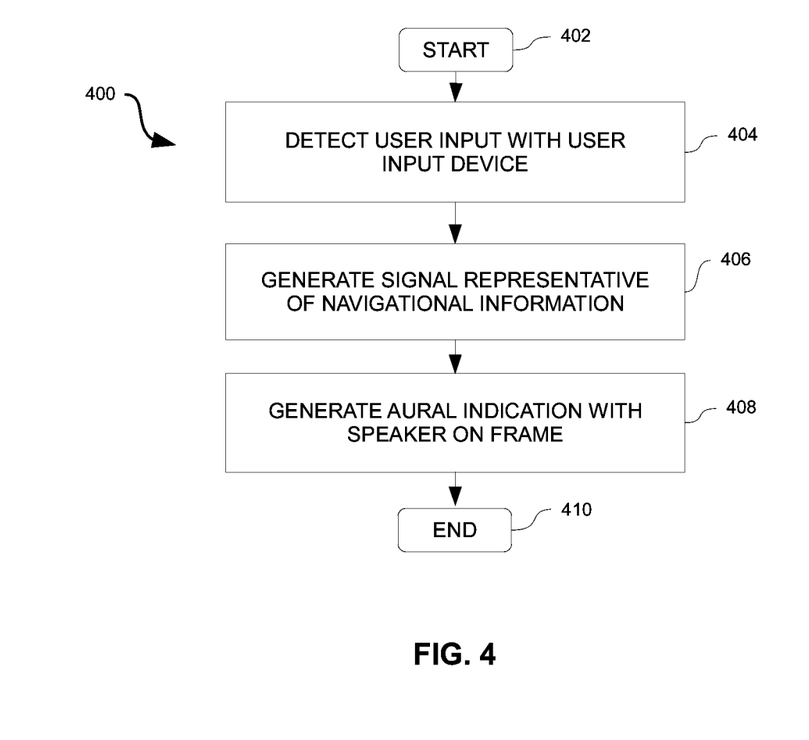
FIG. 4 is a flowchart diagram of an exemplary method for providing recreational assistance according to an embodiment of the present invention.

Turning to FIG. 4, an exemplary method 400 for providing recreational (e.g., golf-related) assistance, in accordance with various aspects of the present invention, is provided. Method 400 may be implemented using the assistant device(s), components, etc., and may implement any of the additional steps, functionality, etc., described above. Method 400 begins (step 402) with, for example, an assistant device, such as those described herein, being powered ON and/or the navigational (or GPS) functionality integrated therein being activated.

User input (e.g., actuation of a button or an aural/voice command) is detected with a user input device (e.g., on or separate from a frame of the assistant device) (step 404). As described above, if the user input is an aural command, the aural command may include any speech that suitably indicates a request for navigational information, such as the distance between two points (e.g., between the assistant device and a landmark, such as a portion of a green on a golf course).

A signal representative of navigational information (e.g., the requested distance) is generated (step 406). More specifically, in some embodiments, the signal is generated and/or received in response to the detection of the aural command. As described above, the signal may be generated by and/or received from a satellite navigation system (and/or a satellite navigation system module), such as a GPS module, which may be connected to the frame.

An aural indication is generated utilizing a speaker on the frame (step 408). As described above, the aural indication may be indicative and/or representative of the requested navigational information (e.g., the requested distance). In some embodiments, the aural indication is a voice response. If the aural command is a first type of aural command, the landmark may be a first portion of the green. If the aural command is a second type of aural command, the landmark may be a second portion of the green. In some embodiments, the speaker(s) is separate from the frame/assistant device, such as integrated into another computing device or a golf cart.

Method ends (step 410) with, for example, the aural indication being generated by the speaker. Additional commands, such as aural commands and/or from input received through other user input devices, may then be received, which may cause the operation of the assistant device(s) as described above. For example, if at least a second aural command is detected, the speaker may be caused to generate a second aural indication representative of a distance between the frame and a second landmark on the golf course.

Figure 5:
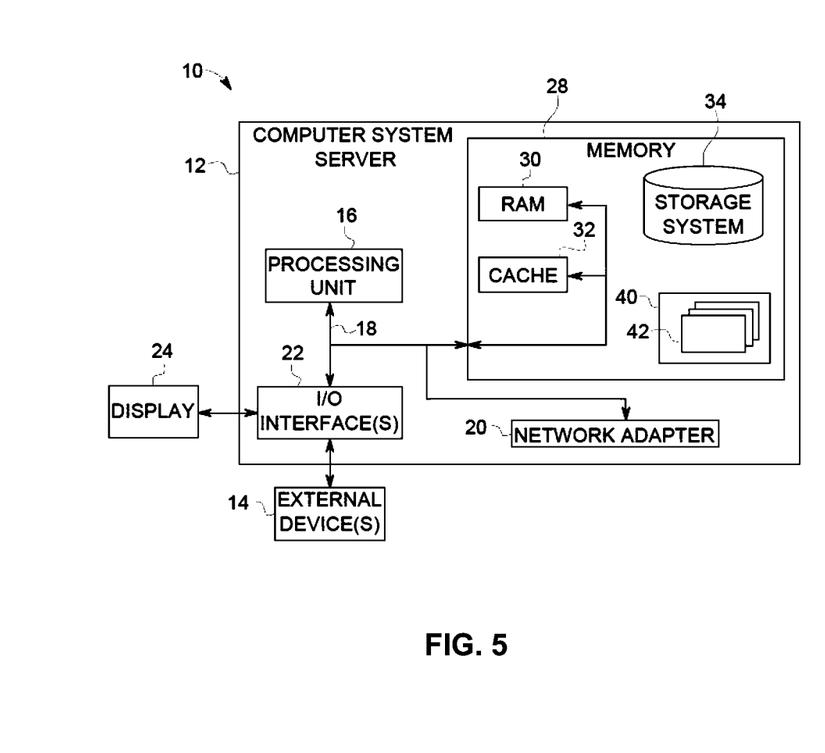
FIG. 5 is a block diagram depicting an exemplary computing device according to an embodiment of the present invention.

Referring now to FIG. 5, a schematic of an example of a computing node 10 is shown. The computing node 10 is provided as an additional example of a device which may implement at least some of the functionality described above. As such, the computing node 10 is only one example of a suitable computing system and is not intended to suggest any limitation as to the scope of use or functionality of embodiments of the invention described herein. Regardless, the computing node 10 (and/or one or more processors described herein) is capable of being implemented and/or performing (or causing or enabling) any of the functionality set forth hereinabove.

In the computing node 10, there is a computer system (and/or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system 12 may be described in the general context of computer system-executable instructions, such as program modules, being executed by a computer system. Generally, program modules may include routines, programs, objects, components, logic, data structures, and so on that perform particular tasks or implement particular abstract data types. The computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, the computer system 12 is shown in the form of a general-purpose computing device. The components of computer system 12 may include, but are not limited to, one or more processors or processing units 16, a system memory 28, and a bus 18 that couples various system components including system memory 28 to processor 16.

The bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system 12 typically includes a variety of computer system readable media. Such media may be any available media that is accessible by the computer system 12, and it includes both volatile and non-volatile media, removable and non-removable media.

The system memory 28 may include computer system readable media in the form of volatile memory, such as random access memory (RAM) 30 and/or cache memory 32. The computer system 12 may further include other removable/non-removable, volatile/non-volatile computer system storage media. By way of example only, storage system 34 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 18 by one or more data media interfaces. The system memory 28 may include at least one program product having a set (e.g., at least one) of program modules that are configured to carry out the functions of embodiments of the invention.

Program/utility 40, having a set (at least one) of program modules 42, may be stored in the system memory 28 by way of example, and not limitation, as well as an operating system, one or more application programs, other program modules, and program data. Each of the operating system, one or more application programs, other program modules, and program data or some combination thereof, may include an implementation of a networking environment. The program modules 42 generally carry out the functions and/or methodologies of embodiments of the invention as described herein.

The computer system 12 may also communicate with one or more external devices 14, such as a keyboard, a pointing device, a display 24, etc.; one or more devices that enable a user to interact with the computer system 12 and/or any devices (e.g., network card, modem, etc.) that enable computer system/server 12 to communicate with one or more other computing devices. Such communication can occur via Input/Output (I/O) interfaces 22. Still yet, the computer system 12 may communicate with one or more networks such as a local area network (LAN), a general wide area network (WAN), and/or a public network (e.g., the Internet) via network adapter 20. As depicted, the network adapter 20 communicates with the other components of computer system 12 via bus 18. It should be understood that although not shown, other hardware and/or software components could be used in conjunction with the computer system 12.

The present invention may be a system (or device), a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A golfing assistant device comprising:
   a frame;
   a Global Positioning System (GPS) module connected to the frame;
   at least one speaker connected to the frame; and
   at least one processor connected to the frame and in operable communication with the GPS module, the at least one speaker, and a user input device, wherein the at least one processor is configured to, in response to a detection of user input by the user input device, cause the at least one speaker to render an aural indication generated based on GPS information received from the GPS module,
   wherein the at least one processor is further configured to cause the at least one speaker to render at least one audio file and cause a volume with which the at least one audio file is rendered by the at least one speaker to be adjusted while the aural indication is rendered by the at least one speaker.

2. The golfing assistant device of claim 1, wherein the at least one processor is further configured to cause the volume with which at least one of the aural indication and the at least one audio file is rendered by the at least one speaker to be adjusted based on at least one of the GPS information and a computing device being detected within a predetermined distance of the frame.

3. The golfing assistant device of claim 1, wherein the at least one processor is further configured to cause the volume with which the at least one audio file is rendered by the at least one speaker to be reduced based on a second golfing assistant device being detected rendering a second audio file within a predetermined distance of the frame.

4. The golfing assistant device of claim 3, wherein the causing of the volume with which the at least one audio file is rendered by the at least one speaker to be reduced comprises causing the rendering of the at least one audio file by the at least one speaker to be ceased, and wherein the at least one processor is further configured to cause the at least one speaker to render the second audio file after said cessation of the rendering of the at least one audio file by the at least one speaker.

5. The golfing assistant device of claim 4, wherein the at least one processor is further configured such that the rendering of the second audio file by the at least one speaker is synchronized with rendering of the second audio file by the second golfing assistant device.

6. The golfing assistant device of claim 1, wherein the user input device comprises at least one of at least one button and at least one microphone, and wherein the user input device is at least one of connected to the frame and separate from the frame.

7. The golfing assistant device of claim 6, wherein the user input device comprises at least one microphone, and wherein the user input detected by the user input device comprises an aural command.

8. The golfing assistant device of claim 1, wherein the GPS information comprises a distance between the frame and a landmark on a golf course.

9. The golfing assistant device of claim 8, wherein the at least one processor is further configured to cause the volume with which at least one of the aural indication and the at least one audio file is rendered by the at least one speaker to be adjusted when the frame is within a predetermined distance of the landmark based on the GPS information indicating that the landmark is at least one of a portion of a green on the golf course and a tee box on the golf course.

10. The golfing assistant device of claim 1, further comprising a wireless communications receiver connected to the frame and in operable communication with the at least one processor, wherein the wireless communications receiver is configured to receive data from a computing device in a vicinity of the frame, wherein the data comprises the at least one audio file.

11. A golfing assistant device comprising:
    a frame;
    at least one speaker connected to the frame; and
    at least one processor connected to the frame and in operable communication with the at least one speaker and a user input device, wherein the at least one processor is configured to, in response to a detection of user input by the user input device, generate a signal representative of a distance between the frame and a landmark on a golf course and cause the at least one speaker to render an aural indication representative of the distance,
    wherein the at least one processor is further configured to cause the at least one speaker to render at least one audio file and cause a volume with which one of the aural indication and the at least one audio file is rendered by the at least one speaker to be adjusted while the other of the aural indication and the at least one audio file is being rendered.

12. The golfing assistant device of claim 11, wherein the at least one processor is further configured to receive navigation information from a navigation system module external to the frame, and wherein the signal representative of the distance between the frame and the landmark on a golf course is generated based on the navigation information.

13. The golfing assistant device of claim 12, wherein the at least one processor is further configured to cause the volume with which at least one of the aural indication and the at least one audio file is rendered by the at least one speaker to be adjusted based on at least one of the navigation information and a computing device being detected within a predetermined distance of the frame.

14. The golfing assistant device of claim 12, further comprising a wireless communications receiver connected to the frame and in operable communication with the at least one processor.

15. The golfing assistant device of claim 11, wherein the user input device comprises at least one of at least one button and at least one microphone, and wherein the user input device is at least one of connected to the frame and separate from the frame.

16. The golfing assistant device of claim 15, wherein the user input device comprises at least one microphone, and wherein the user input detected by the user input device comprises an aural command.

17. The golfing assistant device of claim 11, wherein the at least one processor is further configured to cause the volume with which the at least one audio file is rendered by the at least one speaker to be reduced based on a second golfing assistant device being detected rendering a second audio file within a predetermined distance of the frame.

18. The golfing assistant device of claim 17, wherein the causing of the volume with which the at least one audio file is rendered by the at least one speaker to be reduced comprises causing the rendering of the at least one audio file by the at least one speaker to be ceased, and wherein the at least one processor is further configured to cause the at least one speaker to render the second audio file after said cessation of the rendering of the at least one audio file by the at least one speaker.

19. The golfing assistant device of claim 18, wherein the at least one processor is further configured such that the rendering of the second audio file by the at least one speaker is synchronized with rendering of the second audio file by the second golfing assistant device.

* * * * *